US010299037B2

(12) United States Patent
Yang (10) Patent No.: US 10,299,037 B2
(45) Date of Patent: May 21, 2019

(54) METHOD AND APPARATUS FOR IDENTIFYING AUDIO OUTPUT OUTLET

(71) Applicant: LENOVO (SINGAPORE) PTE. LTD., New Tech Park (SG)

(72) Inventor: Xinmei Yang, New Tech Park (SG)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 430 days.

(21) Appl. No.: 15/059,658

(22) Filed: Mar. 3, 2016

(65) Prior Publication Data

US 2017/0257700 A1 Sep. 7, 2017

(51) Int. Cl.
*H04R 3/00* (2006.01)
*H04R 29/00* (2006.01)
*G06F 3/16* (2006.01)

(52) U.S. Cl.
CPC .............. *H04R 3/00* (2013.01); *G06F 3/165* (2013.01); *H04R 29/001* (2013.01); *H04R 2420/01* (2013.01); *H04R 2420/03* (2013.01); *H04R 2420/05* (2013.01); *H04R 2420/07* (2013.01); *H04R 2499/15* (2013.01)

(58) Field of Classification Search
CPC .... H04R 3/00; H04R 29/001; H04R 2420/05; G06F 3/165; G06F 3/16; G06F 1/1688
USPC .......................................................... 381/58
See application file for complete search history.

(56) References Cited

U.S. PATENT DOCUMENTS

| 8,565,444 | B2 * | 10/2013 | Johnson ................. H04S 7/308 |
| | | | 381/11 |
| 8,676,273 | B1 * | 3/2014 | Fujisaki .............. H04M 1/6505 |
| | | | 455/567 |
| 9,215,528 | B2 * | 12/2015 | Jia ............................ H04R 5/02 |
| 9,516,414 | B2 * | 12/2016 | Hansson ................. H04R 3/04 |
| 9,588,731 | B2 * | 3/2017 | Terai ....................... G06F 3/165 |
| 2001/0011993 | A1 * | 8/2001 | Saarinen ............... G06F 1/1605 |
| | | | 345/156 |
| 2008/0108394 | A1 * | 5/2008 | Davis ...................... H04M 1/03 |
| | | | 455/569.1 |
| 2008/0130867 | A1 * | 6/2008 | Bowen .................... H04M 1/03 |
| | | | 379/443 |
| 2010/0158288 | A1 * | 6/2010 | Winter ..................... H04R 5/04 |
| | | | 381/311 |
| 2012/0219270 | A1 * | 8/2012 | Odaka ..................... H04N 5/76 |
| | | | 386/263 |
| 2014/0044286 | A1 * | 2/2014 | Coles ................... G06F 1/1688 |
| | | | 381/150 |

(Continued)

*Primary Examiner* — Oyesola C Ojo
(74) *Attorney, Agent, or Firm* — Nutter, McClennen & Fish LLP (57) ABSTRACT

Identification and management of audio output outlets connected to a user device is described. Once one or more audio output outlets connected to a user device are identified, an audio signal is forwarded to each detected audio output outlet and in an event the audio signal forwarded to an audio output outlet is detected by an internal audio sensor of the user device, that audio output outlet is designated as a loudspeaker. Audio output outlets designated as loudspeakers are muted when the user device is in silent mode. If the audio signal forwarded to an audio output outlet is not detected by the internal audio sensor of the user device, that audio outlet is marked as a private speaker. Audio output outlets designated as private speakers remain in an audible state even when the user device is in silent mode.

25 Claims, 5 Drawing Sheets

(56) References Cited

U.S. PATENT DOCUMENTS

2014/0222178 A1* 8/2014 Batson .................... G06F 3/165
700/94

* cited by examiner

METHOD AND APPARATUS FOR IDENTIFYING AUDIO OUTPUT OUTLET

FIELD OF INVENTION

The present disclosure generally relates to identifying an appropriate output audio outlet for outputting audio generated by a user device.

BACKGROUND

User devices (e.g., personal computers, laptop computers, tablets, smart phones, etc.) can often include more than one applications or devices that are capable of generating an audio output. For example, a user device (e.g., laptop computer) can include various applications (e.g., web browser applications, music software applications, video software applications, remote conferencing applications, etc.) and/or include or be coupled with various audio generating components (e.g., CD players, DVD players, music players, etc.). Although multiple audio output devices (e.g., speakers, headphones, etc.) can be coupled with a user device to receive and output the audio generated by the various applications and devices, it is often very difficult for the users to control the specific output device that they wish to use for outputting the audio generated by a specific audio application or device.

SUMMARY

In one aspect, a method, computerized system, and computer program product according some embodiments described herein relates to identifying an appropriate output audio outlet for outputting audio generated by a user device. The method, computerized system, and computer program product includes detecting one or more audio output outlets connected to a user device, forwarding an audio signal to each detected audio output outlet and, in an event the audio signal forwarded to an audio output outlet is detected by an internal audio sensor of the user device, designating that audio output outlet as a loudspeaker, and muting audio output outlets designated as loudspeakers when the user device is in silent mode.

In another aspect, a user device having a processor and an internal audio sensor is described. The processor can be configured to detect one or more audio output outlets connected to the user device, forward an audio signal to each detected audio output outlet and in an event the audio signal forwarded to an audio output outlet is detected by the internal audio sensor, designate that audio output outlet as a loudspeaker, and mute audio output outlets designated as loudspeakers when the user device is in silent mode.

In yet another aspect, a method, computerized system, and computer program product that relates to identifying an appropriate output audio outlet for outputting audio generated by a user device is described. The method, computerized system, and computer program product includes detecting one or more audio output outlets connected to a user device, assigning an identifier to each detected audio output outlet, and communicating the identifier assigned to each audio output outlet to a user of the user device.

In other examples, any of the above aspects, or any system, method, apparatus, and computer program product method described herein, can include one or more of the following features.

An audio output outlet can be designated as a loudspeaker based on instructions received from a user of the user device.

An audio output outlet can be designated as a private speaker in an event the audio signal forwarded to an audio output outlet is not detected by the internal audio sensor of the user device. Audio output outlets designated as private speakers can be maintained in an audible state when the user device is in silent mode. An audio output outlet can be designated as a private speaker based on instructions received from a user of the user device.

An identifier can be assigned to each detected audio output outlet and the identifier assigned to each audio output outlet can be communicated to a user of the user device. The identifier assigned to an audio output outlet can be communicated by at least one of playing an audio signal through the audio outlet or displaying the identifier on a screen of the user device.

A priority level can be assigned to each detected audio output outlet and audio produced through the user device can be forwarded to the one or more audio output outlets based on the priority level assigned to each audio output outlet. The priority level assigned to each detected audio output outlet can be received from a user of the user device.

At least one of the one or more audio output outlets can be assigned to a specific audio generating source included in or coupled with the user device. The assignment of the at least one of the one or more audio output outlets to a specific audio generating source included in or coupled with the user device can be done in response to a request received from a user of the user device Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
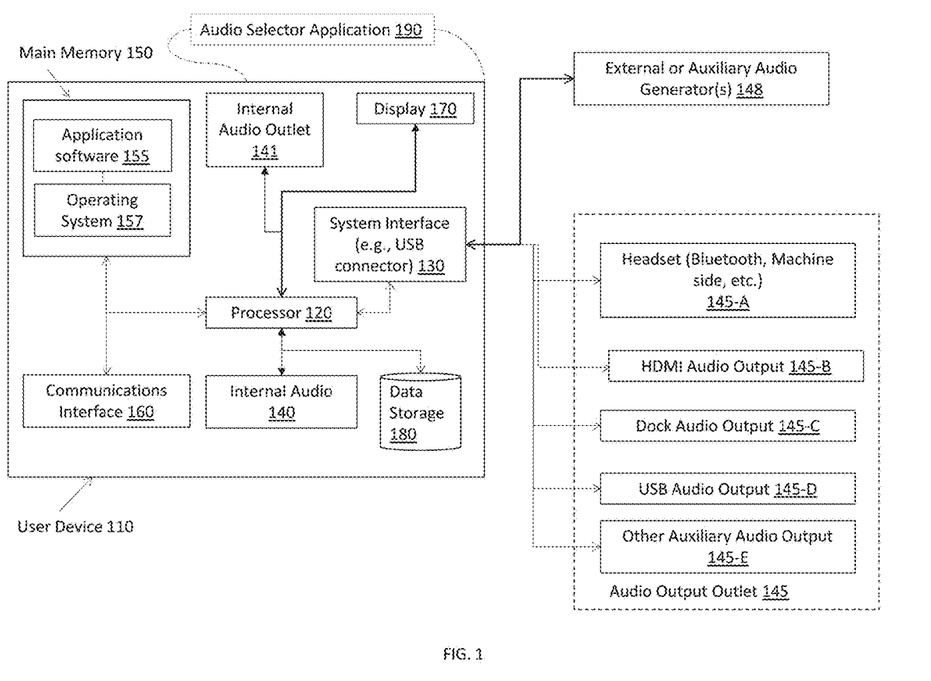
FIG. 1 is a block diagram of a user device that can be used as an apparatus for identifying an audio output device.

FIG. 1 is a block diagram of an example user device 110 that can be used with the embodiments disclosed herein. The user device 110 can include a main memory unit 150 having an operating system 157. The main memory 150 and the operating system 157 can be configured to implement various operating system functions. For example, the operating system 157 can be responsible for controlling access to various devices, implementing various functions of the user device 110, and/or memory management. The main memory 150 can also hold application software 155. For example, the main memory 150 can include various computer executable instructions, application software, and data structures such as computer executable instructions and data structures that implement aspects of the embodiments described herein.

The main memory 150 can be any form of non-volatile memory included in machine-readable storage devices suitable for embodying data and computer program instructions. For example, the main memory 150 can be magnetic disk (e.g., internal or removable disks), magneto-optical disks, one or more of a semiconductor memory device (e.g., EPROM or EEPROM), flash memory, CD-ROM, and/or DVD-ROM disks. The processor 120 and the main memory 150 can be included in or supplemented by special purpose logic circuitry.

The main memory 150 can be connected to a processor 120 and, possibly, a cache unit (not shown) configured to store copies of the data from the most frequently used main memory 150. The processor 120 can include a central processing unit (CPU, not shown) that includes processing circuitry configured to manipulate data structures from the main memory 150 and execute various instructions. For example, the processor 120 can be a general and/or special purpose microprocessor and any one or more processors of any kind of digital computer. Generally, the processor 120 can be configured to receive instructions and data from the main memory 150 (e.g., a read-only memory or a random access memory or both) and execute the instructions. The instructions and other data can be stored in the main memory 150.

The processor 120 can also be connected to an internal audio component 140, such as an internal sound card that can be used in receiving (input) and forwarding (output) audio signals to and/or from the user device 110. The internal audio component 140 can also include an internal audio sensor such as an internally embedded microphone. The processor 120 can also be coupled with an internal audio outlet 141, such as an internal speaker.

The processor 120 can also be connected to various interfaces via a system interface 130, which can be an input/output (I/O) device interface (e.g., USB connector, audio interface, FireWire, etc.). For example, the system interface 130 can connect the user device 110 to various audio output outlets 145, such as a headset (e.g., Bluetooth, machine side, etc.) 145-A, an HDMI audio outlet 145-B, a dock audio outlet 145-C, a USB audio outlet 145-D, and/or other auxiliary audio outlets 145-E. Similarly, the system interface 130 can connect the processor 120 to various external/auxiliary audio generating devices 148, such as CD players, DVD players, microphones, or other auxiliary audio generating devices.

The user device 110 can also include one or more data storage devices 180 and be arranged to transfer data to and/or receive data from the data storage device 180. The user device 110 can also include a communications interface 160 that can provide the user device 110 with a connection to a communications network (not shown). Transmission and reception of data, information, and instructions can occur over the communications network. The user device 110 can also include a display 170 for receiving and/or displaying information. The display 170 can be a touch display and/or any type of display known in the art.

The user device 110 can include various digital electronic circuitry or computer hardware that can be used with the embodiments disclosed herein, for example the digital circuitry associated with a desktop or laptop computer. The techniques described herein, without limitation, can be implemented in digital electronic circuitry or in computer hardware that executes software, firmware, or combinations thereof. The implementation can be as a computer program product, for example a computer program tangibly embodied in a non-transitory machine-readable storage device, for execution by, or to control the operation of, data processing apparatus, for example a computer, a programmable processor, or multiple computers.

The user device 110 can include an audio output selector application 190 that can be used for selecting an audio output outlet 145 from among various audio output outlets that may be connected to the user device 110. The audio output selector application 190 can be presented to a user (not shown) of the user device 110 using an application (e.g., application software) that provides an interactive medium for receiving input from the user. The interactive medium can be displayed on the display screen 170 of the user device. The audio output selector application 190 can be a web-based platform. Alternatively or additionally, a user of the user device 110 can access the audio output selector application 190 through an interactive medium provided by the application software or using any other technique known in the art.

The program codes that can be used with the embodiments disclosed herein, for example the program codes associated with the audio output selector application 190, can be implemented and written in any form of programming language, including compiled or interpreted languages, and can be deployed in any form, including as a stand-alone program or as a component, module, subroutine, or other unit suitable for use in a computing environment. A computer program can be configured to be executed on one computer or on multiple computers at one site or distributed across multiple sites and interconnected by a communications network.

One or more programmable processors can execute a computer program to operate on input data, perform function and methods described herein, and/or generate output data. An apparatus can be implemented as, and method steps can also be performed by, special purpose logic circuitry, such as a field programmable gate array (FPGA) or an application specific integrated circuit (ASIC). Modules can refer to portions of the computer program and/or the processor or special circuitry that implements that functionality.

Figure 2A:
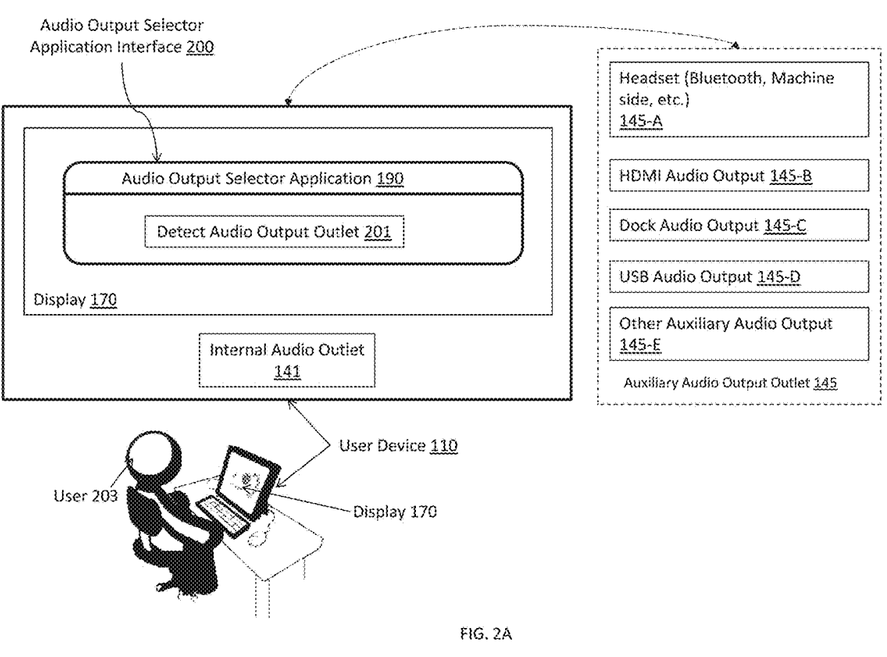
FIG. 2A is a block diagram of an example interface for detecting an appropriate audio output outlet for forwarding audio generated by a user device according to embodiments disclosed herein.

FIG. 2A is a block diagram of an example interface 200 for the audio output selector application 190. As shown in FIG. 2A, the audio output selector application interface 200 can be displayed to the user 203 on the display screen 170 of the user device 110. The audio output selector application interface 200 can include a field 201 that allows the user 203 to request detection of available audio output outlets. The user can request the detection of audio output outlets by any method available in the art. For example, the user can click on the field 201 or, in the case of a display having touch screen capabilities, touch or tap the field 201.

In response to the user's request, the audio output selector application 190 searches for all available internal, external, and/or auxiliary audio output outlets that are connected to the user device 110. For example, the audio output selector application 190 can determine whether any internal audio outlets 141 are directly connected to the processor 120. Alternatively or additionally, the audio output selector application 190 can determine whether the user device 100 (e.g., the system interface 130 of the user device 110) is connected to any external and/or auxiliary audio output outlets 145.

For example, the audio output selector application 190 can verify if any of a headset 145-A, HDMI audio output 145-B, dock audio output 145-C, a USB audio outlet 145-D, or any other auxiliary or external audio output outlet 145-E is connected to the system interface 130 of the user device. The audio output selector application 190 can also verify if any auxiliary or external devices are connected to the user device 130 using a physical (e.g., wired, USB, etc.) and/or wireless (e.g., Bluetooth, 802.11, etc.) connection.

Figure 2B:
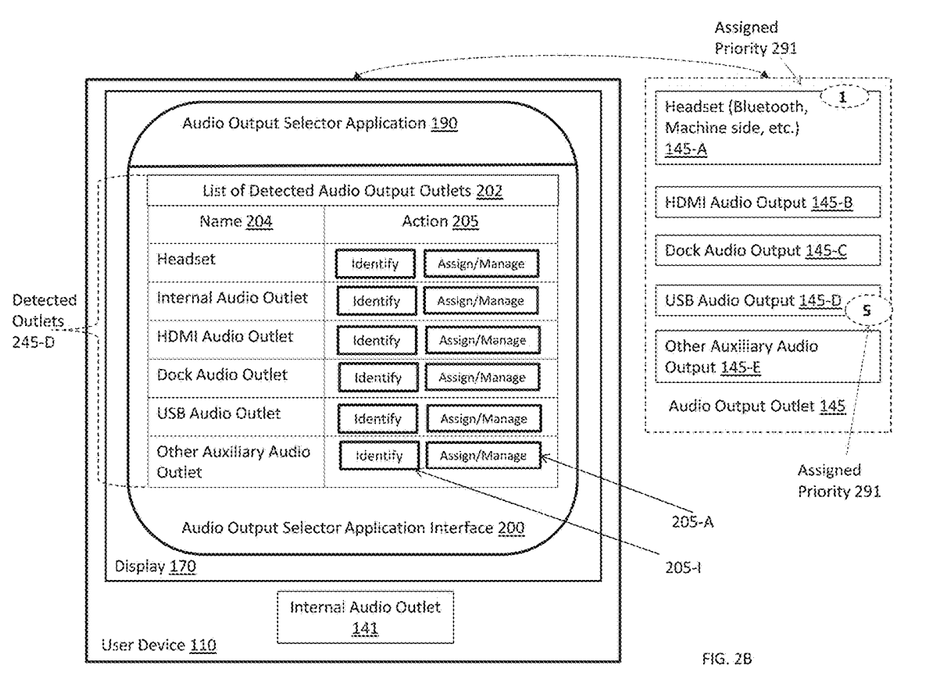
FIG. 2B is a block diagram of an example interface for identifying and managing available audio output outlets connected to a user device according to embodiments disclosed herein.

FIG. 2B is a block diagram of an example interface for identifying and assigning priorities to available output audio outlet mediums for outputting audio generated by a user device according to embodiments disclosed herein. If/once the audio output selector application 190 determines that one or more internal/external audio output outlets are connected to the user device 110, the audio output selector application 190 can display a list of the available detected audio output outlets 202 to the user 203. As shown in FIG. 2B, the list 202 can be displayed to the user 203 using the audio output selector application interface 200 on the display 170 of the user device 110. It should be noted that although shown and described as a list 202, the embodiments described herein do not necessarily require displaying a list of detected audio outlets to the user 203. Generally, any technique that can communicate some information regarding the detected audio output outlet to the user can be employed.

The list 202 can include various fields for use in managing the detected audio output outlets 245-D. For example, the list 202 can include a name 204 field that displays the name of each detected device (e.g., headset, internal audio, HDMI audio, dock audio, USB audio, other audio, etc.). Although shown as textual display of names of the audio outlets, any technique known in the art can be used to communicate information identifying the detected audio output outlets 245-D to the user 203. For example, the list 202 can include images of the detected outlets 245-D, brand names of the detected outlets, general description of the detected outlets, or a combination thereof.

The list 202 can also include one or more fields for allowing the user 203 to take certain actions 205 with respect to the detected audio output outlets 202. For example, as shown in FIG. 2B, the list 202 can include an action field 205 that allows the user 203 to take certain actions regarding the discovered audio outlets 245-D. Although shown as a part of the list 203, the action field can appear in any location on the display screen 170 with respect to the discovered list of the audio output outlets 202, for example as a separate field, a separate and independent window, etc.

It should be noted that although the interface 200 is shown as having multiple identify 205-I and/or assign/manage 205-A fields, embodiments disclosed herein do not require the interface 200 to include identify and/or assign/manage fields. Specifically, as described later with respect to FIG. 4, the audio output selector application 190 can identify the available audio output outlets 145 automatically and/or without requiring any action or input from the user. Accordingly, the interface 200 does not need to necessarily have a field for receiving input from the user regarding identification of audio output outlets. Additionally or alternatively, the interface 200 can have less or more identify fields than the number of detected audio output outlets. For example, the interface 300 can have a single identify field 205-I that upon activation identifies all of the audio output outlets connected to the user device.

Similarly, the interface 200 does not need to include a field for assigning and/or managing the detected audio output outlets 145. Specifically, as described later with respect to FIG. 4, the audio output selector application 190 can manage and/or assign priorities to the available audio output outlets 145 automatically and/or without requiring any action or input from the user. Accordingly, the interface 200 does not need to necessarily have a field for receiving input from the user regarding management and/or assignment of priorities to the detected audio output outlets. Additionally or alternatively, the interface 200 can have less or more assign/manage fields than the number of detected audio output outlets. For example, the interface 300 can have a single assign and/or manage field 205-A that upon activation signals the audio output selector application 190 to manage and/or assign priorities to the detected audio output outlets.

The action field 205 corresponding to each detected audio output outlet can include one or more fields for managing the detected audio outlets 245-D. For example, the action field 205 can include a field 205-I that allows the user to request identification of the detected audio output outlet. In situations when the audio output selector application 190 detects more than one audio output outlet, the user 203 can use the identification field 205-I to request specific identification of a selected detected device. For example, the user can activate (e.g., click on or touch) the identify 205-I field of the USB audio output outlet and request identification of the audio output outlet.

In response, the audio output selector application 190 creates a signal to indicate to the user 203 the audio output outlet that has been selected by the user 203. The audio output selector application 190 can use any method known in the art to specify the selected audio output outlet. For example, the audio output selector application 190 can specify the audio output outlet by playing a sound through the audio outlet, turning on a light on the audio outlet, or any other technique known in the art.

For example, the audio output selector application 190, in response to the user 203 requesting identification of the USB audio output outlet 145-D (e.g., by activating the identify field 205-I corresponding to the USB audio output outlet 145-D in the list of detected audio output outlets 202), can play a sound through the USB audio output outlet 145-D to signal to the user 203 the audio output outlet that she has selected. Alternatively and/or additionally, other techniques can be used to identify the selected device. For example, the audio output selector application 190 can display an image of the selected audio output outlet on the display screen 170.

The audio output selector application 190 can also provide the user 203 with the option of managing the detected audio output outlets 245-D. The audio output selector application 190 can provide the user 203 with the ability to manage each detected audio output outlet using a field 205-A in the interface of the audio output selector application 190. The management options provided by the audio output selector application 190 can include any management function available in the art. It should be noted that the identification and management functions described above can be performed by the audio output selector application 190, without requiring any instructions/input from the user.

Figure 3:
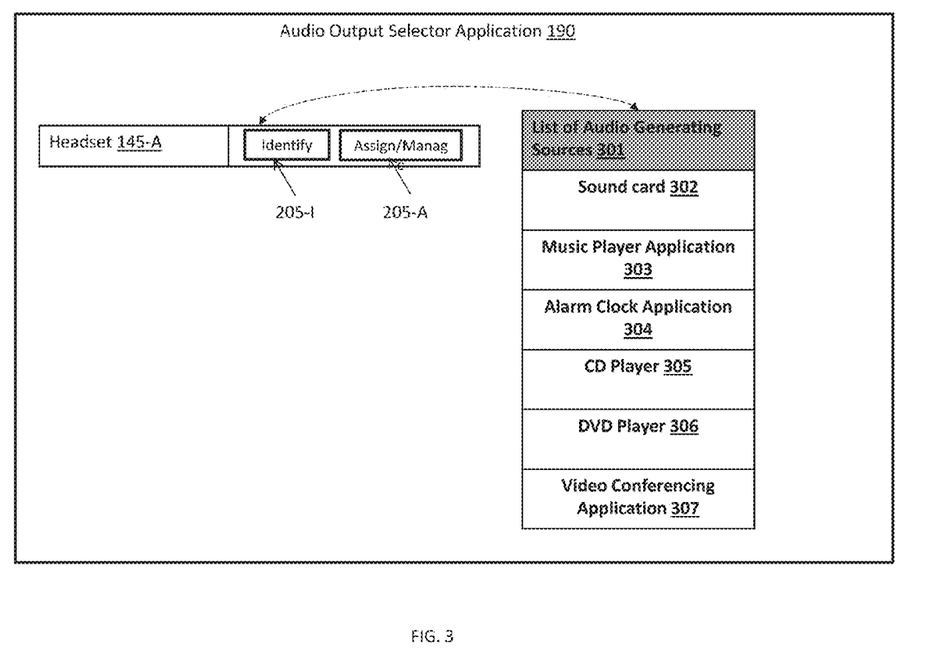
FIG. 3 is a block diagram of an example interface for assigning an audio output outlet to an audio generating source.

FIG. 3 is a block diagram of an example interface for assigning an audio output outlet to an audio generating source. As shown in FIG. 3, the audio output selector application 190 can provide the user 203 with the option of assigning a selected output outlet to a specific audio generating source or giving a specific output outlet a specific priority. Specifically, in response to activation of the management/assign field 205-A for a specific audio output outlet, the audio output selector application 190 can provide the user 203 with a list of internal, external, and/or auxiliary applications and/or modules of the user device 110 that can generate or output audio (hereinafter "audio generating source") and allow the user to assign the specific audio output outlet to a select audio generating source.

For example, in response to activation of the management/assign field 205-A for a specific audio output outlet (e.g., headset 145-A), the audio output selector application 190 can provide the user 203 with a list 301 including internal audio generating applications and/or modules 140 (e.g., sound cards 302 and any application programs capable of generating an audio output such as music players 303, video players (not shown), alarm clock applications 304, video conferencing applications 307, etc.) and external or auxiliary audio generators 148 (e.g., CD player 305, DVD player 306, etc.) that may be connected to the user device 110. The audio output selector application 190 can allow the user 203 to select an audio generating source (e.g., CD player 305) and assign that audio generating source to the specific audio output outlet (e.g., headset 145-A). In response to the user's assigning a specific audio generating source (e.g., CD player 305) to a specific audio output outlet (headset 145-A), the audio output selector application 190 directs the audio generated by the specific audio generating source (e.g., CD player 305) to the selected audio output outlet (headset 145-A).

Alternatively and/or additionally, the audio output selector application 190 can allow the user to choose and/or manage the order in which she wishes to employ the detected audio output outlets 145 by assigning various priority levels 291 to the detected audio outlets 145. This feature can be beneficial when the user 203 wishes to use a certain audio outlet (e.g., headset 145-A) as her default/preferred audio outlet for the user device 110 and only utilize the remaining audio outlets if/when her preferred audio outlet is being used to output audio.

For example, assuming that the user's preferred audio outlet 145 is the headset 145-A, the user 203 can use the manage/assign filed 205-A of the audio output selector application 190 to request that this audio outlet 145-A is given the highest priority level 291. This assignment of preference/priority can be done by any method known in the art, for example, as shown in FIG. 2B, by setting the preference level 291 for this outlet to 1. The user 203 can also indicate the audio outlet that she wishes to use if and when her preferred audio outlet (e.g., headset 145-A) is in use. For example, the user can indicate to the audio output selector application 190 that she wishes to use another audio outlet (e.g., HDMI audio output 145-B) if and when the audio outlet with the highest priority (headset 145-A) is in use. The user can also assign various priority/preference levels to the remaining audio outlets (e.g., the USB audio output 145-D is shown as being fifth in line for user preference). Under this configuration, the user 203 can utilize her preferred audio outlet to output audio produced by any of the audio generating sources of the user device 110 as long as the preferred audio outlet is not being already used to output audio. However, if the preferred audio outlet is being already used to output audio, the audio output selector application 190 directs the produced audio to the audio outlet having the next highest priority level (i.e., the next preferred audio outlet).

The audio output selector application 190 can also allow the user 110 to request interruption of the audio being currently played through a preferred audio outlet for audio generated by another audio generating source. For example, if the user 203 has assigned both the music player applica-tion 303 and the alarm clock application 304 to the headset 145-A, the audio output selector application 190 can interrupt music being output through the headset 145-A to play audio generated by the alarm clock application 304.

Alternatively and/or additionally, the audio output selector application 190 can allow the user to assign one or more audio output outlet 145 as a private audio outlet or a loudspeaker. The audio output selector application 190 treats any audio outlet 145 that is set as a loudspeaker as an outlet whose output can be heard by individuals other than the user 203. Similarly, if an audio outlet is set as a private outlet, the audio output selector application 190 treats the audio output by that outlet as being only heard by the user 203.

By allowing the user 203 to assign certain audio outlets as being loud speakers, the audio output selector application 190 can control the sounds that are played through the audio outlets 145 when the device is left in silent mode. Specifically, in response to an audio outlet 145 being set as a loud speaker, the audio output selector application 190 mutes all output directed to that audio outlet when the user device is left in silent mode.

For example, the user 203 may have left her device in silent mode but have an audio generating application (e.g., a timer application or an alarm clock) running on her device 110. Although most presently available user devices (e.g., cellular phones, tablets, etc.) allow the user to mute the sounds generated by incoming phone calls and text messages, they continue to forward and play the sounds generated by audio generating applications (e.g., timers, alarms, etc.) even when the device is in silent mode. This can be disrupting and bothersome, especially to a user who has inadvertently left an application such as a timer running on the background of her user device 110.

The audio output selector application 190 can overcome this difficulty by muting all sounds forwarded to a loud speaker when the user device is in silent mode and/or the user has chosen to enter a silent or mute configuration (e.g., by selecting an option to "mute all") on her user device 110. When in silent mode, the audio output selector application 190 continues to forward audio produced by the audio generating sources to any audio outlet that has been designated as being private by the user 203.

It should be noted that the identification and management functions described above can be performed by the audio output selector application 190, without requiring any instructions/input from the user. Specifically, the audio output selector application 190 can determine whether an audio outlet 145 should be set as a private audio outlet or as a loud speaker without needing to receive any input from the user (or in addition to instructions received from the user). The audio output selector application 190 can also assign priority levels to the audio outlets 145 without needing to receive any instructions from the user (or in addition to instructions received from the user).

Figure 4:
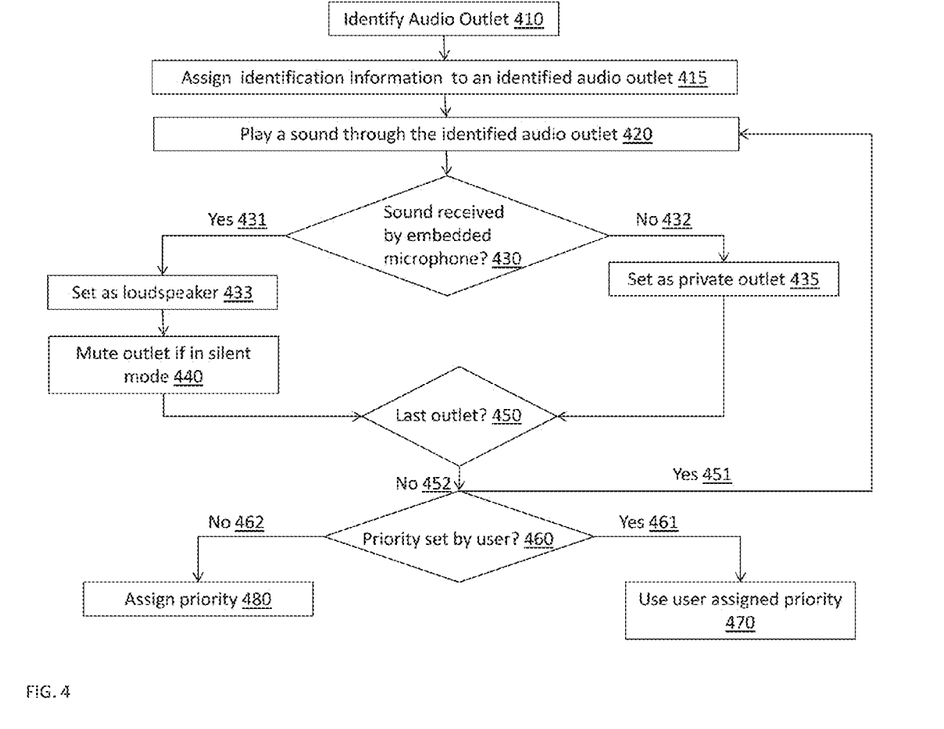
FIG. 4 is a simplified flow diagram of the procedures that may be used by embodiments described herein for managing audio output outlets connected to a user device.

FIG. 4 is a simplified flow diagram of the procedures that may be used by embodiments described herein for determining whether audio output outlets connected to the user device 110 should be treated as private audio outlets and also for assigning various priority levels to the audio outlets 410.

As shown in FIG. 4, the audio output selector application 190 can determine whether any audio output outlets are connected to the user device. As noted previously, the audio output selector application 190 can search for and identify connected audio outlets in response to a request to a user (e.g., activation of a detection field 201 located on an interface of the audio output selector application 190). Additionally or alternatively, the audio output selector application 190 can initiate detection and identification of available audio outlets using any other technique known in the art. For example, the detection and identification process can begin every time the audio output selector application 190 is first loaded/started, when the user device is started or turned on, or in response to an auxiliary device being connected to the user device. In some embodiments, the audio output selector application 190 can be a program running on the background of the user device and arranged to check for available audio output outlets at predetermined time periods and/or every time an auxiliary device is connected to the user device.

It should be noted that the audio output selector application 190 can identify the audio output outlets as the audio output outlets are connected to the device and need not to necessarily identify all of the connected audio output outlets at once. Also, as noted above, the identification of the connected audio output outlets can occur automatically and without any requiring interactions or instructions from the user. For example, the user device can identify and record related information regarding user devices as they are connected and/or removed from the user device. This information can be saved on the user device and used by the audio output selector application 190. For example, every time an audio output outlet (e.g., the headset 145-A) is connected to the user device, the audio output selector application 190 can identify the audio output outlet and record the audio output outlet (e.g., the headset 145-A) as an outlet connected to the user device. For example, the user device can maintain a list of all audio outlets that are connected to the user device at any given point in time and record any newly identified audio outlet in that list.

Similarly, every time an audio output outlet (e.g., the headset 145-A) is removed from the user device, the audio output selector application 190 can identify the removed audio output outlet and remove the audio output outlet from the list of audio outlets connected to the user device.

Once the available audio output outlets 145 have been identified, the audio output selector application 190 can allow the user 203 to manage the detected audio outlet outputs 145 (as described with reference to FIG. 2A, FIG. 2B, and FIG. 3) and/or proceed to manage the detected audio outlets without receiving any instructions from the user. Alternatively or additionally, the audio output selector application 190 can perform certain management functions in addition to the management instructions provided by the user 203.

For example, the audio output selector application 190 can assign certain identification information to the detected audio outlets 415. The audio output selector application 190 can use any type of identification information that can be used to uniquely identify the audio outlets. For example, the audio output selector application 190 can assign a character string, a name, a number, a combination of characters and numbers, etc. to each identified audio outlet. In assigning the identification information, the audio output selector application 190 can receive input from the user 203. For example, the audio output selector application 190 can display the name or an image of the audio outlet on the screen and ask the user to assign an identifier to the audio outlet.

The user can assign an identifier to an audio outlet using any method known in the art, for example by pressing a key (e.g., a number key) on the keypad (or keyboard) of the user device 110. For example, in the embodiment illustrated in FIG. 1, the user can assign numbers 1, 2, 3, 4, and 5 and/or letters A, B, C, D, and E to designate the audio outlets. As noted, the identification information can also be assigned by the audio output selector application 190 to each audio outlet. If assigned by the audio output selector application 190, the audio output selector application 190 can relay to the user the identifier that has been assigned to the audio outlet. The audio output selector application 190 can relay this information using various methods such as by displaying an image of (or some information identifying) the audio outlet along with the identifier information that has been assigned to the outlet and/or by playing a sound indicating some information regarding the identifier to the user.

For example, referring to FIG. B, the audio output selector application 190 can indicate that number "1" has been assigned as the identifier for the headset 145-A, by displaying an image of number "1" next to an image of the headset 145-A. Any technique in the art can be used to relay this information to the user 203. For example, the audio output selector application 190 can play a sound stating number "1" through the headset 145-A.

In addition to/in place of receiving instructions from the user regarding whether an audio outlet should be treated as a private audio outlet or as a loud speaker, the audio output selector application 190 can determine whether to treat a detected audio outlet as a private audio outlet by playing a sound through the identified audio outlet 420 and evaluating whether the sound played through the audio outlet is received by an internal microphone embedded in the user device 430.

If the sound played through the audio outlet is received by an internal audio sensor (e.g., an internal microphone) embedded in the user device 431, the audio output selector application 190 can conclude that the audio outlet is a loud speaker 433. The audio output selector application 190 designates this audio outlet as a loud speaker (e.g., by saving some information in the memory 150 of the user device indicating that the outlet is a loud speaker) and ensures that any sound played through this audio outlet is muted while the device is in silent mode 440.

If the sound played through the audio outlet is not received by the internal audio sensor embedded in the user device 432, the audio output selector application 190 can conclude that the audio outlet is a private audio outlet 435. As noted above, audio forwarded to private audio outlets is not muted when the user device is in silent mode unless specifically requested by the user.

The audio output selector application 190 can further proceed by determining if the audio outlet evaluated for being a loud speaker or a private outlet is the last audio outlet in need of evaluation 450 from among the devices identified during identification of audio outlets (box 410) or whether there are any other audio outlets that should be evaluated. If other audio outlets are available 451, the audio output selector application 190 proceeds to repeat the procedures summarized above (box 420 through box 450).

If the audio output selector application 190 determines that all detected/identified audio outlets have been evaluated 452, the audio output selector application 190 proceeds to evaluate the identified devices to determine whether the user 203 has assigned an appropriate priority level to each audio outlet (i.e., whether the user has indicated her preference as to the order in which she wishes to utilize the audio outlets) 460. If the user has assigned a priority level to the audio outlets 461 (e.g., using an interface of the audio output selector application 190, as described above), the audio output selector application 190 proceeds by using the priority levels assigned by the user in managing the audio outlets. If the user has not assigned a priority level to the audio outlets 461, the audio output selector application 190 proceeds by assigning appropriate priority levels to the audio outlets. Priority levels can be assigned using any techniques available in the art, for example based on the manufacturer of the audio outlet and by giving preference to outlets designed by certain manufacturers over outlets designed by others. Additionally and/or alternatively, priority levels can be assigned depending on whether the audio outlet is a private outlet or a loud speaker. For example, the audio output selector application 190 can assign higher priority levels to the outlets classified as private outlets and lower priority levels to outlets classified as loud speakers. Alternatively, the audio output selector application 190 can assign higher priority levels to the outlets classified as loud speakers and lower priority levels to outlets classified as private outlets.

While the invention has been particularly shown and described with reference to specific illustrative embodiments, it should be understood that various changes in form and detail may be made without departing from the spirit and scope of the invention.

What is claimed is:

1. A computerized method comprising:
    detecting one or more audio output outlets connected to a user device;
    forwarding an audio signal to each detected audio output outlet and in an event the audio signal forwarded to an audio output outlet is detected by an internal audio sensor of the user device, designating that audio output outlet as a loudspeaker;
    designating an audio output outlet as a private speaker in an event the audio signal forwarded to an audio output outlet is not detected by the internal audio sensor of the user device; and
    muting audio output outlets designated as loudspeakers when the user device is in silent mode.

2. The computerized method of claim 1 further comprising maintaining audio output outlets designated as private speakers in an audible state when the user device is in silent mode.

3. The computerized method of claim 1 further comprising designating an audio output outlet as a private speaker based on instructions received from a user of the user device.

4. The computerized method of claim 1 further comprising assigning an identifier to each detected audio output outlet and communicating the identifier assigned to each audio output outlet to a user of the user device.

5. The computerized method of claim 4 further comprising communicating the identifier assigned to an audio output outlet by at least one of playing an audio signal through the audio outlet or displaying the identifier on a screen of the user device.

6. The computerized method of claim 1 further comprising designating an audio output outlet as a loudspeaker based on instructions received from a user of the user device.

7. The computerized method of claim 1 further comprising assigning a priority level to each detected audio output outlet and forwarding audio produced through the user device to the one or more audio output outlets based on the priority level assigned to each audio output outlet.

8. The computerized method of claim 1 further comprising receiving the priority level for assigning to each detected audio output outlet from a user of the user device.

9. The computerized method of claim 1 further comprising assigning at least one of the one or more audio output outlets to a specific audio generating source included in or coupled with the user device.

10. The computerized method of claim 9 further comprising assigning the at least one of the one or more audio output outlets to a specific audio generating source included in or coupled with the user device in response to a request received from a user of the user device.

11. A computer program product, tangibly embodied in a non-transitory computer readable storage medium, comprising instructions being operable to cause a data processing system to:
    detect one or more audio output outlets connected to a user device;
    forward an audio signal to each detected audio output outlet and in an event the audio signal forwarded to an audio output outlet is detected by an internal audio sensor of the user device, designate that audio output outlet as a loudspeaker;
    cause a data processing system to designate an audio output outlet as a private speaker in an event the audio signal forwarded to an audio output outlet is not detected by the internal audio sensor of the user device; and
    mute audio output outlets designated as loudspeakers when the user device is in silent mode.

12. The computerized program product of claim 11 further comprising instructions being operable to cause a data processing system to maintain audio output outlets designated as private speakers in an audible state when the user device is in silent mode.

13. The computerized program product of claim 11 further comprising instructions being operable to cause a data processing system to designate an audio output outlet as a private speaker based on instructions received from a user of the user device.

14. The computerized program product of claim 11 further comprising instructions being operable to cause a data processing system to assign an identifier to each detected audio output outlet and communicate the identifier assigned to each audio output outlet to a user of the user device.

15. The computerized program product of claim 14 further comprising instructions being operable to cause a data processing system to communicate the identifier assigned to an audio output outlet by at least one of playing an audio signal through the audio outlet or displaying the identifier on a screen of the user device.

16. The computerized program product of claim 11 further comprising instructions being operable to cause a data processing system to designate an audio output outlet as a loudspeaker based on instructions received from a user of the user device.

17. The computerized program product of claim 11 further comprising instructions being operable to cause a data processing system to assign a priority level to each detected audio output outlet and forwarding audio produced through the user device to the one or more audio output outlets based on the priority level assigned to each audio output outlet.

18. The computerized program product of claim 11 further comprising instructions being operable to cause a data processing system to receive the priority level for assigning to each detected audio output outlet from a user of the user device.

19. The computerized program product of claim 11 further comprising instructions being operable to cause a data processing system to assign at least one of the one or more audio output outlets to a specific audio generating source included in or coupled with the user device.

20. The computerized program product of claim 19 further comprising instructions being operable to cause a data processing system to assign the at least one of the one or more audio output outlets to a specific audio generating source included in or coupled with the user device in response to a request received from a user of the user device.

21. A user device comprising:
   an audio sensor;
   a processor, the processor being configured to:
      detect one or more audio output outlets connected to the user device;
      forward an audio signal to each detected audio output outlet and in an event the audio signal forwarded to an audio output outlet is detected by the internal audio sensor, designate that audio output outlet as a loudspeaker;
      cause a data processing system to designate an audio output outlet as a private speaker in an event the audio signal forwarded to an audio output outlet is not detected by the internal audio sensor; and
      mute audio output outlets designated as loudspeakers when the user device is in silent mode.

22. The user device of claim 21 wherein the processor is further configured to maintain audio output outlets designated as private speakers in an audible state when the user device is in silent mode.

23. The user device of claim 21 wherein the processor is further configured to designate an audio output outlet as a private speaker based on instructions received from a user of the user device.

24. The user device of claim 21 wherein the processor is further configured to assign an identifier to each detected audio output outlet and communicate the identifier assigned to each audio output outlet to a user of the user device.

25. The user device of claim 21 wherein the processor is further configured to assign a priority level to each detected audio output outlet and forwarding audio produced through the user device to the one or more audio output outlets based on the priority level assigned to each audio output outlet.

* * * * *